United States Patent
Levy et al.

(10) Patent No.: US 8,050,563 B2
(45) Date of Patent: Nov. 1, 2011

(54) SELF CHECKING OPTICAL ADD DROP MULTIPLEXER

(75) Inventors: Avi Levy, Ramat-Gan (IL); Uri Mahlab, Or-Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 628 days.

(21) Appl. No.: 12/282,351

(22) PCT Filed: Mar. 8, 2007

(86) PCT No.: PCT/IL2007/000309
§ 371 (c)(1),
(2), (4) Date: Sep. 9, 2008

(87) PCT Pub. No.: WO2007/102163
PCT Pub. Date: Sep. 13, 2007

(65) Prior Publication Data
US 2009/0074418 A1 Mar. 19, 2009

(30) Foreign Application Priority Data
Mar. 9, 2006 (IL) .......................................... 174229

(51) Int. Cl.
*H04J 14/02* (2006.01)
(52) U.S. Cl. ................ 398/83; 398/48; 398/58
(58) Field of Classification Search .................. 398/3, 4, 398/12, 16, 19, 33, 38, 45, 48, 58, 75, 79–83, 398/175, 177; 385/15–17, 24, 27, 37, 40, 385/127, 130; 370/228, 248
See application file for complete search history.

(56) References Cited

U.S. PATENT DOCUMENTS

| | | | | |
|---|---|---|---|---|
| 5,319,632 A | * | 6/1994 | Iwasaki | 370/228 |
| 5,859,941 A | * | 1/1999 | Horita et al. | 385/37 |
| 5,867,289 A | * | 2/1999 | Gerstel et al. | 398/12 |
| 5,920,412 A | * | 7/1999 | Chang | 398/83 |

(Continued)

FOREIGN PATENT DOCUMENTS
EP 0948153 A2 10/1999
(Continued)

OTHER PUBLICATIONS

Roberto Gaudino et.al., "Mosaic: A Multiwavelength Optical Subcarrier Multiplexed controlled Network," IEEE J. on Selected Areas in communications, vol. 16, No. 7, Sep. 1998, 1270-1285.

(Continued)

*Primary Examiner* — Loha Ben (57) ABSTRACT

A technique is proposed for performing add/drop operations in an OADM assembly serving an optical network and comprising an add unit and a drop unit. With respect to at least one optical channel assigned to an optical wavelength $\lambda$, the OADM assembly is capable of dropping the channel from the network via the drop unit as a first signal, and adding the channel to the network via the add unit as a second signal. According to the technique, the OADM assembly additionally comprises an authentication and control unit ACU for authenticating the at least one optical channel and controlling the OADM assembly. The ACU is authenticates the optical channel by comparing one or more components of the first signal with one or more components of the second signal serving as a reference, and based on the authentication result, makes decisions whether to allow or block the dropping and/or adding of the optical channel.

10 Claims, 4 Drawing Sheets

U.S. PATENT DOCUMENTS

| | | | |
|---|---|---|---|
| 6,701,085 B1 * | 3/2004 | Muller | 398/4 |
| 6,778,721 B2 * | 8/2004 | Jeong | 385/15 |
| 7,711,270 B2 * | 5/2010 | Ooi et al. | 398/175 |
| 2004/0109685 A1 | 6/2004 | Wan | |
| 2004/0175179 A1 | 9/2004 | Xiao | |
| 2005/0226621 A1 | 10/2005 | Kikiuchi | |

FOREIGN PATENT DOCUMENTS

| | | |
|---|---|---|
| EP | 1347591 A | 9/2003 |

OTHER PUBLICATIONS

Yoshiyuki Hamazumi et al, "Transmission capacity of Optical path Overhead Transfer scheme using pilot tone for Optical path network,", J. Lightwave Tech., vol. 15, No. 12, Dec. 1997, 2197-2205.

Chun-Kit Chan et al. "Demonstration of a Fault-Tolerant WDM add-drop/branching Unit for Long Haul Optical transmission Systems," IEEE Photonics Tech. Letters, vol. 11, No. 8, Aug. 1999.

* cited by examiner

| N | 1 | 2 | 3 | 4 | 5 |
|---|---|---|---|---|---|
| | NMS order for λ1(d)# | Energy at filter 30 | Activation of drop (switch23) | Activation of add (switch25)* | Fault or fraud detected |
| 1 | 1 | Low | No | No | Yes |
| 2 | 1 | High | Yes | Yes | No |
| 3 | 0 | Low | No | Yes | No |
| 4 | 0 | High | No | No | Yes |

1-DROP 0-DON'T DROP  
*ADD λ1a IS ORDERED BY NMS

FIG. 4B

| N | 1 | 2 | 3 | 4 | 5 |
|---|---|---|---|---|---|
| | NMS order for λ1(d)# | Modulating tone present | Activation of drop (switch23) | Activation of add (switch25)* | Fault or fraud detected |
| 1 | 1 | No | No | No | Yes |
| 2 | 1 | Yes | Yes | Yes | No |
| 3 | 0 | No | No | Yes | No |
| 4 | 0 | Yes | No | No | Yes |

SELF CHECKING OPTICAL ADD DROP MULTIPLEXER

FIELD OF THE INVENTION

The present invention relates to optical add drop multiplexers (OADMs).

BACKGROUND OF THE INVENTION

A number of papers, for example Jigesh K. Patel, Sung U. Kim, David H. Su, Suresh Subramaniam, Hyeonig-Ah Choi "*A Framework for Managing Faults and Attacks in WDM Optical Networks*"—supported in part by the DAPRA under grant N66001-00-18949 and Shut-Kit Chan, Frank Tong, Lian-Kuan Chen, Dennis Lam "*Demonstration of a Fault-Tolerant WDM add-drop/branching Unit for Long Haul Optical Transmission Systems*". IEEE Photonics Technology Letters, vol 11, No. 8, August 1999 discuss a problem of managing faults and attacks in WDM optical networks, and a model of a fault-tolerant add-drop branching unit. Such a unit is planned to detect fiber cuts and failures of optical amplifiers. All operations performed in the discussed unit are based on checking and comparing power of the received, added and dropped signals.

US patent application 2004/0175179 describes a self-adjusting optical add-drop multiplexer (OADM), and optical network using same. The self-adjusting optical add-drop multiplexer monitors the power in a drop signal and attenuates the power in an add signal to match the power in express WDM channels (signals). When used in a fiber network, and more particularly, in a metro network, the deleterious effects of optical amplification are reduced. Power attenuation is also used in an optical switching assembly particularly useful in two-fiber ring network. The optical switching assembly monitors drop channels from the two rings of the network and attenuates the add channel(s) accordingly. An optical switch operates to direct the drop signal from one of the two rings to a receiver in accordance with a control signal based on the monitored drop channels. The self-adjusting optical add-drop multiplexer also monitors the power in the drop signals and issues an alarm if the drop signal is of a power level above or below predetermined levels.

It should be noted that the above self-adjusting OADM sets a task of adjusting (equalizing) powers of added, dropped and through channels. It does not pay any attention at all to a possibility of penetration, into the optical network, of a signal having a wrong (or non-exact) optical wavelength, or an optical wavelength issued from a foreigner source.

US published patent application 2004/0109685 A1 describes an OADM comprising a demultiplexer wherein each optical channel is being marked with a pilot tone for channel identification and monitoring. The pilot tones are detected, cleaned from ghost tones, and then re-inserted in the respective optical channels being fed into the multiplexer of the OADM, for multiplexing said optical channels into a WDM output signal.

The above-mentioned 2004/0109685 A1 is intended for monitoring the presence or absence of different optical channels in the network for purposes of management; it does not consider a task of channel authentication and/or security in optical networks. The problem of authentication of optical channels becomes especially important when optical networks utilize novel reconfigurable OADMs.

To the best of the Applicant's knowledge, solutions to such a problem have not been considered in the prior art.

SUMMARY OF THE INVENTION

It is therefore the object of the invention to provide a technological solution enabling more safe and secure operation in optical networks utilizing OADMs (especially reconfigurable or tunable OADMs).

The above object can be achieved by providing an OADM assembly comprising a drop unit and an add unit for serving an optical network (preferably, a multi-channel WDM optical network), wherein with respect to at least one optical channel assigned to an optical wavelength $\lambda$, said OADM assembly being capable of dropping said channel from the network via the drop unit as a first signal, and adding said channel to the network via the add unit as a second signal, the OADM assembly additionally comprising an authentication and control unit ACU for authenticating said at least one optical channel and controlling said OADM assembly, said ACU being operative to authenticate said at least one optical channel by comparing one or more components of said first signal with one or more components of said second signal serving as a reference, and the ACU being also operative to allow or block the dropping of said optical channel to a client and/or the adding of said optical channel, based on a result of said authentication.

In the frame of the present patent application, the term authentication of an optical channel should be understood as checking, for example:

a) whether an optical channel dropped at a specific port of the OADM is indeed the channel which is expected at that specific port of the OADM, b) whether the signal (the first signal) in the dropped channel comprises specific indications accepted in the network, and the like.

The checking of the dropped channel can be performed by checking whether the signal (first signal) dropped at a port assigned at the OADM for said dropped channel, satisfies one or more specific requirements which are posed in the network and presented in the OADM (with the aid of equipment of its add unit) as one or more components of the second signal which can be produced at least for the purpose of the authentication.

The proposed OADM further incorporates a new feature of allowing or precluding the drop and/or add operations based on the authentication results obtained at the ACU unit.

However, there are other conditions, which should preferably be taken into account by the ACU for deciding whether to perform the add/drop operations, for example such conditions may be as follows:

whether the dropped channel, which has really been dropped, should have to be dropped at the OADM according to information obtained from the Network Management System (NMS); and whether the client submitted a predetermined ID/password to ACU, matching to that stored in the ACU.

It should be kept in mind that, in the frame of the present application, the drop operation is to be understood as an operation of supplying information dropped from the OADM to an authorized client. The self-checking OADM and the corresponding method may further enable checking a predetermined key/ID/password submitted by a client to the OADM, and allowing the dropping operation only when this key is approved by the OADM.

For processing the authentication results and any additional conditions, and for making the decision concerning the add/drop operations, the ACU comprises a control and processing unit CP.

The most important implementation of such an authentication arrangement is for re-configurable OADMs (ROADM), where the added and the dropped channels can be varied and where the hardware responsible for selecting different channels to be dropped/added is always in a stand-by position. Tunable OADMs can be considered a type of ROADMs.

The authentication and control unit is preferably capable of continuously monitoring said at least one optical channel.

The authentication can be based on detecting, by said authentication and control unit ACU, presence or absence of a predetermined modulating tone in the first signal of an optical channel to be dropped and in the second signal of said optical channel to be added, thereby if both the first signal and the second signal comprise the predetermined modulating tone, said optical channel is authenticated. Preferably, the ACU preliminarily applies the predetermined modulating tone(s) to the carrier wavelength $\lambda$, thus obtaining the modulated second signal serving the reference.

For the purpose of the following description:
1) we will call $\lambda d$ the optical carrier wavelength of an optical channel which has really been dropped at a particular port of the drop unit of said OADM, wherein the optical channel having the optical carrier wavelength $\lambda$ is expected at said particular port.
2) We will call $\lambda a$ (wherein $\lambda a = \lambda$) the optical carrier wavelength of an optical channel technically available to be added via the add unit. It goes without saying that the optical channel having the carrier wavelength $\lambda$ can be added to the network only when that optical channel is absent at that particular network section, for example when the same optical channel has been just dropped.

In one preferred embodiment, the authentication may comprise comparison of the carrier wavelength $\lambda d$ with the corresponding carrier wavelength $\lambda a = \lambda$, (actually, with the expected carrier wavelength $\lambda$), by comparing their respective carrier frequencies $\omega_{\lambda d}$ and $\omega_\lambda$; the authentication and control unit ACU further decides whether to allow the dropping operation and/or the adding operation, based on a result of the comparison.

In the preferred embodiment,
the add unit comprises at least one tunable laser TL for adding said at least one optical channel to the WDM optical network,
the ACU of the OADM is capable of selectively altering the carrier frequency $\omega_{\lambda a}$ at the wavelength $\lambda a$ to obtain a control signal with altered frequency $\omega_{\lambda a} \pm \omega_{\lambda if}$, where $\lambda if$ is a so-called intermediate wavelength being not an accepted wavelength of any optical channel in said network;
the ACU comprising a mixing block for mixing said control signal with said first signal having the carrier frequency $\omega_{\lambda d}$, thereby obtaining a mixed signal;
the ACU further comprising an optical filter capable of detecting energy in the mixed signal at the intermediate frequency $\omega_{\lambda if}$,
the ACU also comprising a comparator block capable of comparing the energy detected by said filter with a predetermined energy threshold.

Preferably, the comparator block includes an optic to electric (O/E) converter at its input, for converting optical energy detected at the optical fiber into electrical energy to be inputted into said comparator.

In a further embodiment, the ACU (more particularly, CP of the ACU) should be capable of allowing or not allowing operations of adding/dropping by further taking into account information about expected channels to be dropped/added at specific ports of the OADM, usually provided to the OADM by a Network Management System (NMS).

In this specific case, the ACU of the OADM assembly is capable of performing:
a) monitoring a port of the drop unit, assigned to an optical channel having a carrier wavelength $\lambda$ which is expected according to information from NMS, for detecting presence of any dropped channel;
b) authentication of the optical channel whenever detected, and
c) based on results of the steps a) and b), deciding whether to allow the adding of said optical channel via the add unit to the network and/or the dropping of the optical channel via the drop unit to the client.

There is also provided a method for performing add/drop operations in an OADM assembly serving an optical network (such as a multi-channel WDM optical network) and comprising a drop unit having a number of ports and an add unit, the method comprises performing the following operations within the OADM assembly:
detecting a first signal dropped from the network at the drop unit at a port assigned to an optical channel having an optical carrier wavelength $\lambda$,
providing a second signal having the carrier wavelength $\lambda$ of said optical channel, said second signal being suitable for adding to the network via the add unit,
performing authentication of said optical channel by comparing one or more components of said first signal with one or more components of said second signal serving as a reference,
allowing or blocking the drop operation of said optical channel to a client and/or the add operation of said optical channel to the network, based on a result of said authentication.

The method preferably comprises continuous or periodic monitoring of said at least one port of the drop unit for detecting said first signal.

As described above concerning the OADM assembly, the authentication may comprise, for example, checking the fact of presence of a predetermined modulating tone (s) in the first signal; said predetermined modulating tone(s) is/are preliminarily inserted in the second signal to make it suitable for being added to the network.

Further, the modulating tone can be periodically changed in a preliminarily agreed order (say, a digital code applied to the modulation), which is "known" to nodes originating the traffic in the discussed OADM network (but unknown to an intruder trying to penetrate the network with using false optical channels).

Preferably, (alternatively or in addition), the authentication step of said optical channel may comprise:
comparison of a real carrier wavelength $\lambda d$ of the first signal dropped at the drop unit with the carrier wavelength $\lambda a$ of the second signal ready to be added via the add unit, (wherein $\lambda a = \lambda$); and
considering the optical channel to be authenticated when said $\lambda d$ is essentially equal to said $\lambda a$.

Using the above approach, the real carrier wavelength $\lambda d$ of the dropped signal is compared with the expected carrier wavelength λ. It can be performed by comparing their respective carrier frequencies $\omega_{\lambda d}$ and $\omega_{\lambda a}$, (where $\omega_{\lambda a}=\omega_{80}$), Particularly, the comparison of the wavelengths λa and λd can be performed as follows:

selectively altering the carrier frequency $\omega_{\lambda a}$ at the wavelength λa to obtain a control signal with altered frequency $\omega_{\lambda a}\pm\omega_{\lambda if}$, where λif is a so-called intermediate wavelength being not an accepted wavelength of any optical channel in said network;

mixing said control signal with said first signal having the carrier frequency $\omega_{\lambda d}$, thereby obtaining a mixed signal;

detecting energy of the mixed signal at the intermediate frequency $\omega_{\lambda if}$, comparing the energy detected by said filter with a predetermined energy threshold,     if the energy is equal or higher than said threshold, considering that the wavelengths λa and λd are essentially equal (thereby λd is authenticated);

if the energy is lower than said threshold, considering that λd essentially differs from the λa, (thereby λd is not authenticated).

It should be noted that, due to the generally sinusoidal character of the mixed signals, only in case that λb is essentially equal to λa, the filter detects considerable energy at a narrow frequency interval around the intermediate frequency $\omega_{\lambda if}$ corresponding to the wavelength λif.

Further, the step of allowing or blocking the operation of adding and dropping preferably comprises taking into account information about:

expected channels to be dropped/added at specific ports of the OADM (usually provided to the OADM by a Network Management System (NMS);

results of authentication, if conducted by checking additional components of the first signal of said optical channel; and     checking of ID/password, if presented by a client supposed to receive the first signal from the OADM and checked in said OADM.

More specifically, the method may comprise checking a predetermined ID/password submitted to the OADM assembly by a client supposed to receive said first signal, and allowing the dropping operation to said client only when the ID/password is approved by the OADM.

The above method and the suitable OADM equipment allows detecting a) internal faults in the OADM assembly, b) faults/degradations of laser sources of the WDM optical network, which transmit signals to the discussed OADM, as well as c) interference of possible foreign/fraudulent sources of optical signals.

BRIEF DESCRIPTION OF THE DRAWINGS

The invention will further be described with reference to the following non-limiting drawings, in which.

DETAILED DESCRIPTION OF THE PREFERRED EMBODIMENTS

Figure 1:
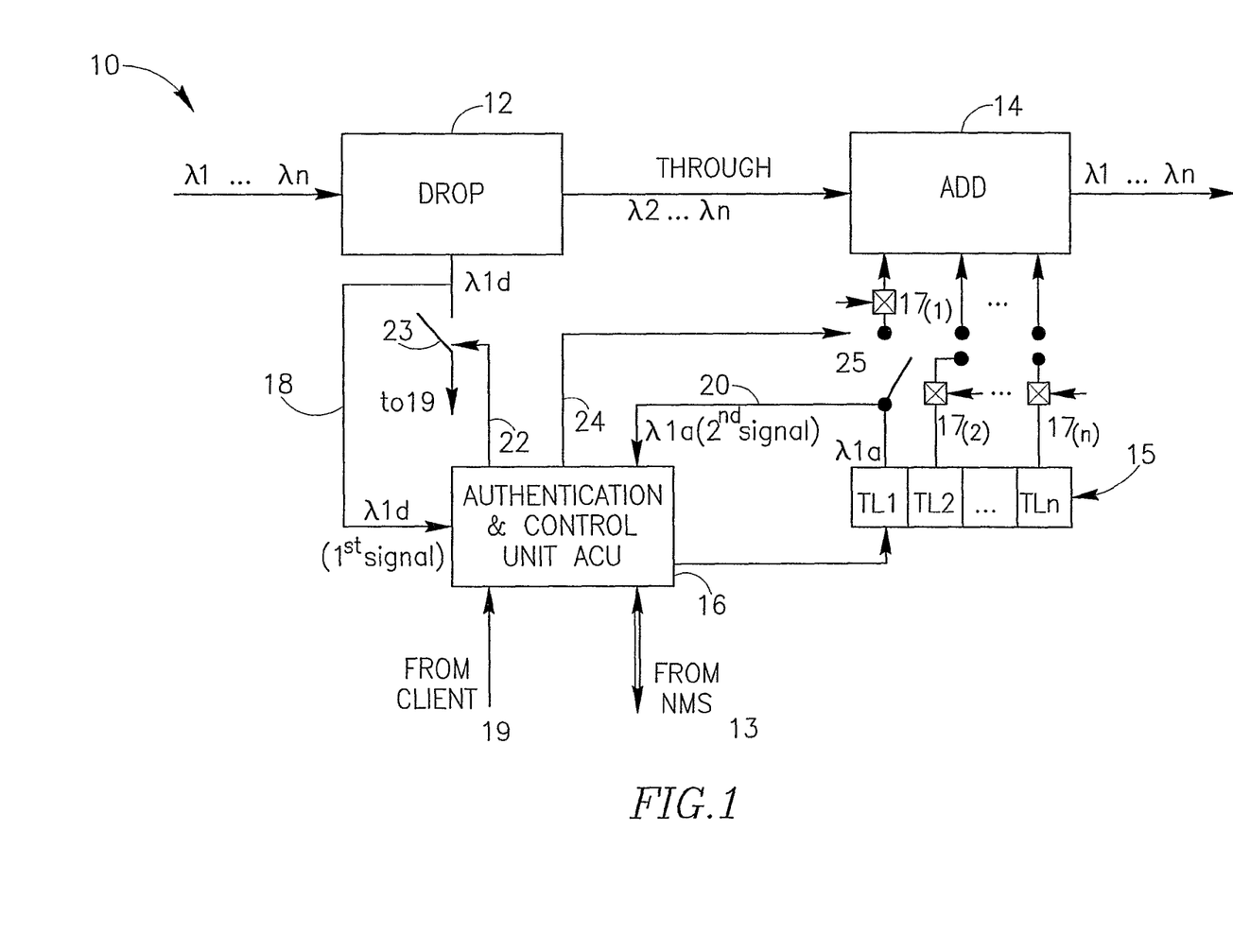
FIG. 1 illustrates one schematic embodiment of the proposed self-checking OADM.

FIG. 1 illustrates a general scheme of the proposed self-checking OADM assembly 10. The assembly comprises a drop unit 12 including a plurality of tunable filters (not shown), an add unit 14 coupled to a group 15 of tunable lasers TL1 . . . TLn, and a proposed authentication and control unit (ACU) 16. The tunable lasers may form part of the add unit, in this case such an add unit can be implemented as an optical transponder.

Each of the tunable lasers TL1, TL2, . . . TLn is respectively associated with a data modulating block 17(1), 17(2) . . . 17(*n*) which can be placed either before switch 25, or after switch 25. A Network Management System NMS schematically marked 13 controls the OADM assembly 10 via its ACU 16.

In the illustrated diagram, the ACU 16 is adapted to continuously check an optical channel to be dropped, that has a carrier wavelength λ1*d*. The checking procedure is performed as follows:

a) The Network Management System (EMS) 13 informs the ACU which optical channel is to be dropped and which is to be added (say, λ1 called λ1*d* is to be dropped and λ1 called λ1*a* is to be added);

b) the signal obtained at the drop unit 12 over the carrier wavelength λ1*d*—i.e., the first signal 18—is fed to the ACU 16;

c) ACU activates the tunable laser TL1 in the group 15 that serves the add unit 14, in order to obtain a second signal to be transmitted at the required carrier wavelength λ1 (called λ1*a*). The tunable laser TL1 emits a required carrier wavelength λ1*a*. The emitted wavelength is usually modulated by a data signal at the block 17(1). Optionally, the carrier wavelength or the data can be modulated by a predetermined modulating or dithering tone (equipment for that is not shown in this figure). The obtained resulting signal constitutes the so-called second signal 20. In other words, the second signal may comprise the carrier wavelength only, or the carrier wavelength modulated with a modulating tone and/or a data signal.

d) The obtained second signal is then fed to the ACU 16, where it is compared with the first signal 18.

If the two signals coincide (i.e., one or more of their components are substantially equal, depending on a number of conditions preliminarily set)—the channel associated with λ1*d* is authenticated and the drop operation can be allowed (control arrow 22 to the switch 23). We keep in mind that, in the frame of the present application, the drop operation is to be understood as an operation of supplying information dropped from the OADM, to an authorized client. The method and the corresponding self-checking OADM may further ensure checking a predetermined key/password submitted by a client 19 to the OADM (i.e., to its ACU), and allowing the dropping operation only when the key is approved by the OADM.

If the corresponding add operation is required according to the instruction of NMS 13, it can also be allowed, though detailed conditions of allowing the add/drop operations will be discussed later on, with reference to FIG. 4.

Figure 2:
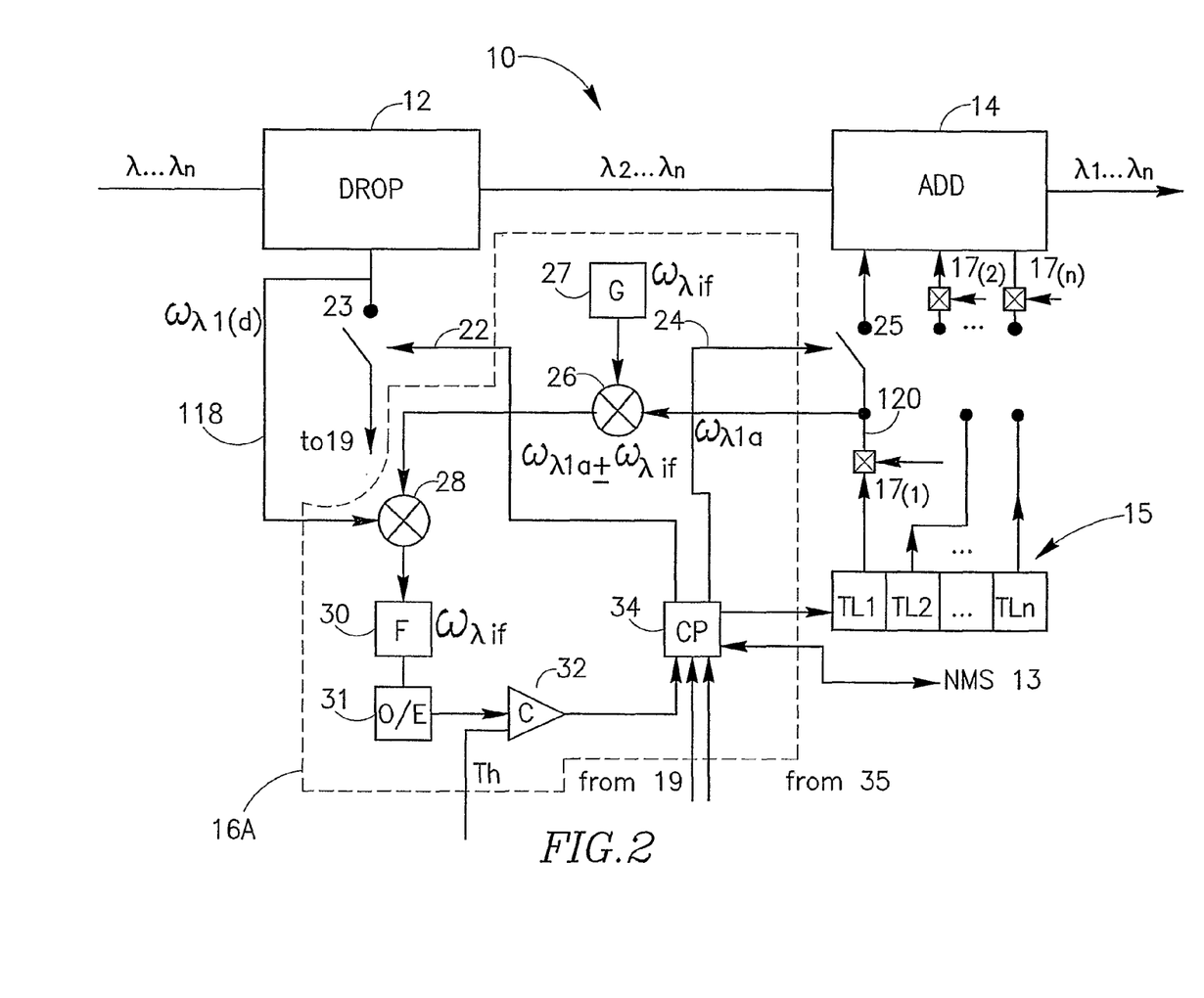
FIG. 2—illustrates one exemplary embodiment of the authentication and control unit ACU of the OADM, based on comparing wavelengths of a channel to be dropped and a corresponding channel ready to be added.

FIG. 2 shows one preferred embodiment 16A (shown in dotted lines) of the ACU, which performs comparing a first signal 118 and a second signal 120 from the point of their carrier wavelengths. Several reasons may explain the necessity of checking the wavelength. In a real network and in a real OADM, a port intended for dropping one specific optical channel may apparently be configured (say, by mistake) for dropping a different channel. Another example is any internal fault in the add block of the OADM, which may also cause discrepancy when attempting to check a dropped signal, and will thus allow detecting the presence of an internal fault. A third example is a non-exact carrier wavelength, which may be caused by any fault in the optical network or used by an intruder to penetrate to the network and interfere into its work; such a non-exact wavelength may therefore be detected if properly checked.

In this drawing, functions of the ACU 16A are illustrated with respect to one optical channel only, but analogous operations can be simultaneously performed with respect to other optical channels, whenever required: similar ACU assemblies, or a combined ACU can be built to serve multiple optical channels.

The ACU 16A comprises a first mixer block 26 coupled with a generator 27 of frequency $\omega_{\lambda if}$, a second mixer block 28, a narrowband optical filter 30 for detecting frequencies in close proximity to $\omega_{\lambda if}$, an optic to electric (O/E) converter 31, a comparator 32 and a control processing unit CP 34. Input ports of CP 34 receive commands from NMS 13, optionally from a client 35. Output ports of CP 34 issue internal control instructions in the OADM assembly 10. Output ports of the CP 34 activate one or more required tunable lasers from the group 15, and control the drop operation and the add operation of the OADM assembly via the schematically shown switches 23 and 25, respectively. CP may also report results of the authentication process to the NMS.

The second signal 120 has the carrier frequency $\omega_{\lambda 1a}$ and optionally carries data added at the modulator 17(1). It is mixed (multiplied) at the first mixer block 26 with a signal having frequency $\omega_{\lambda if}$, produced by the generator 27. The result of the first mixing is a control signal having the altered frequency $\omega_{\lambda 1a} \pm \omega_{\lambda if}$, which appears at the output of the first mixer block 26.

The control signal is further fed to the second optical mixer block 28, where it is mixed (multiplied) with the first signal 118 arriving from the drop unit 12 at the carrier frequency $\omega_{\lambda 1d}$.

The result of the second mixing will be called a mixed signal; it is further fed to the fixed optical narrowband filter 30 adjusted to detect signals in the vicinity to the frequency $\omega_{\lambda if}$.

For simplicity of the description, let us assume that all the signals are sinusoidal. Trigonometric mathematical transformations show that the mixed signal will comprise a detectable component around the above-mentioned frequency only when $$\lambda 1(d) = \lambda 1(a), \text{ i.e., } \lambda 1(d) = \lambda.$$

(One example of the calculation will be presented below.)

Upon converting the signal detected by the optical filter 30 into electric form (by the O/E converter 31), the comparator 32 compares energy of the signal with a predetermined threshold Th, and provides the result to the CP block 34. Based on that, the CP 34 decides whether to confirm authentication of the optical channel to be dropped, and whether to allow the drop and/or add operations taking into account information obtained from the NMS 13 and, optionally, from modules 35 checking the dropped signal according to other parameters, and/or from the client 19.

Example of the calculation:

Let us check, using a specific example, how the proposed two-stage mixing of sinusoidal signals helps performing authentication of an optical channel to be dropped.

Remember that $$\cos(\alpha)\cos(\beta) = \tfrac{1}{2}[\cos(\alpha+\beta) + \cos(\alpha-\beta)] \qquad (1)$$

Let the interacting three signals are as follows:

$A(t)\cos(\omega_{\lambda d}t)$—is a first signal dropped from the drop unit (i.e., it is not obligatory dropped directly to the client) in an optical channel having a carrier wavelength $\lambda d$ and modulated by a function $A(t)$ being data, a modulating tone or the like.

$B\cos(\omega_{\lambda 1}t)$—is a second signal generated and ready to be added to an optical channel having wavelength $\lambda 1$. In this case, we assume that no data or other modulation is applied to the carrier wavelength $\lambda 1$.

$\cos(\omega_{\lambda if}t)$—is a so-called control signal having an intermediate wavelength $\lambda if$ not belonging to any accepted optical channel. The control signal is taken without any coefficient.

1. When a second signal is mixed (multiplied) with the control signal, the following signal is obtained:

$$B\cos(\omega_{\lambda 1}t)^*\cos(\omega_{\lambda if}t); \qquad (2)$$

2. When the obtained signal is further mixed (multiplied) with the first signal, the following mixed signal is obtained:

$$A(t)B\cos(\omega\lambda 1t)^*\cos(\omega\lambda ift)^*\cos(\omega\lambda dt) \qquad (3)$$

3. By applying the above-mentioned trigonometric transforming equation (1) to the first two "cos" functions in the signal (3), the above expression can be written down as follows:

$$\tfrac{1}{2}A(t)B\{\cos[(\omega_{\lambda 1} - \omega_{\lambda if})t] + \cos[(\omega_{\lambda 1} + \omega_{\lambda if})t]\}\cos(\omega_{\lambda d}t) \qquad (4)$$

To transform the whole expression (4), let us multiply:

$$\tfrac{1}{2}A(t)B\{\cos[(\omega_{\lambda 1} - \omega_{\lambda if})t]^*\cos(\omega_{\lambda d}t) \qquad (4a), \text{ and}$$

$$\tfrac{1}{2}A(t)B\{\cos[(\omega\lambda 1 + \omega\lambda if)t]^*\cos(\omega_{\lambda d}t) \qquad (4b)$$

If we apply the trigonometric equation (1) to (4a), we will obtain:

$$\tfrac{1}{4}A(t)B\{\cos[(\omega_{\lambda d} - \omega_{\lambda 1} + \omega_{\lambda if})t] + \cos[(\omega_{\lambda d} + \omega_{\lambda 1} - \omega_{\lambda if})t]\}$$

If we apply the trigonometric equation (1) to (4b), we will obtain:

$$\tfrac{1}{4}A(t)B\{\cos[(\omega_{\lambda 1} + \omega_{\lambda if} + \omega_{\lambda d})t] + \cos[(\omega_{\lambda 1} + \omega_{\lambda if} - \omega_{\lambda d})t]\}$$

4. If now we assume that $\lambda 1 = \lambda d$, both the part (4a), and the part (4b) of the signal (4) will look as follows:

$$\tfrac{1}{4}A(t)B\{\cos(\omega_{\lambda if}t) + \cos(2\omega_{\lambda 1} - \omega_{\lambda if})t\} \qquad (4c)$$

Therefore, the complete signal (4) will look as follows:

$$\tfrac{1}{2}A(t)B\{\cos(\omega_{\lambda if}t) + \cos(2\omega_{\lambda 1} - \omega_{\lambda if})t\} \qquad (4d)$$

The above means that if the assumption is true, the first component of the signal (4d) can be detected, with a considerable amplitude $\tfrac{1}{2} A(t)B$, by a narrowband filter at the frequency $\omega_{\lambda if}$ (or at the wavelength $\lambda_{if}$). The second component "$\cos(2\omega_{\lambda 1} - \omega_{\lambda if})t$" of the signal (4d) will be spaced, by wavelength and frequency, quite far from the first component and cannot be detected by the narrowband filter of frequency $\omega_{\lambda if}$. Therefore, if $\lambda 1 = \lambda d$ of the dropped signal, that fact can be confirmed by detecting expected energy at the wavelength $\lambda_{if}$.

The remaining component "$\cos(2\omega_{\lambda 1} - \omega_{\lambda if})t$" will be just filtered out by the narrowband filter.

5. If, by any mistake or by purpose $\lambda d = \lambda 2$ (i.e., $\lambda d$ is not equal to $\lambda 1$), the signal (4) will comprise two components, each being as follows:

$$\tfrac{1}{4}A(t)B\{\cos[(\omega_{\lambda 1} + \omega_{\lambda 2})t] + \cos[(\omega_{\lambda 1} + \omega_{\lambda if} - \omega_{\lambda 2})t]\}$$

In such a case, none of the components of signal (4) will be detected by the narrowband filter at the wavelength $\lambda_{if}$ (no energy will be detected at the output of the narrowband filter of $\omega_{\lambda if}$). This fact can serve the evidence that the dropped channel has the wavelength different than that of the channel which is supposed to be added instead of the dropped one.

Figure 3:
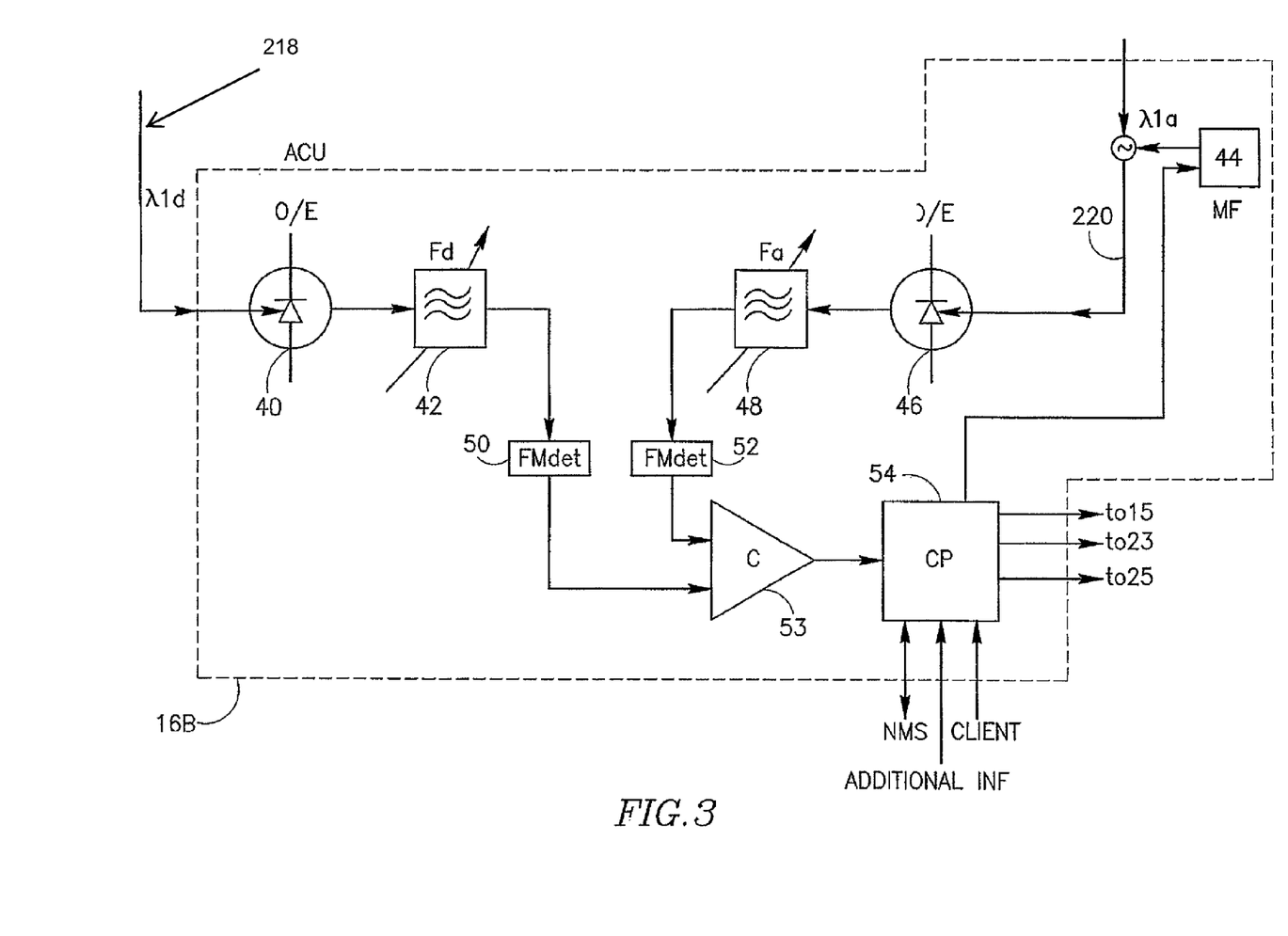
FIG. 3—illustrates another specific embodiment of the OADM, wherein its Authentication and Control unit ACU is based on detecting an expected modulating tone in an optical signal to be dropped.

FIG. 3 illustrates one alternative embodiment 16B of the Authentication and Control unit ACU, based on detecting and checking an expected modulating tone(s) in a specific optical signal to be dropped. However, checking the presence/absence of a modulating tone in the optical channel can be performed in addition (and in parallel) to the method of channel authentication shown in FIG. 2. Such a combined authentication can be performed by a combined authentication module. More than one such combined modules for checking/authenticating different optical channels can be incorporated in the self-checking OADM.

A first optical signal 218 to be dropped via the OADM, having the carrier wavelength $\lambda 1d$ (or the carrier frequency $\omega_{\lambda 1d}$) and supposedly modulated by a predetermined modulation tone(s), is applied to an optic/electric converter 40 illustrated as a light diode. The obtained electrical signal is applied to an electrical tunable filter 42 adjusted to the frequency of the expected predetermined modulation tone(s).

In the add block of the proposed OADM, the mentioned predetermined modulating tone (modulating frequency) should be preliminarily applied to the carrier wavelength $\lambda 1a$ of the optical channel which is ready for replacing the corresponding dropped channel having the wavelength $\lambda 1d$. It is performed using a modulating frequency (MF) block 44 which can be controlled by NMS, and preferably via the CP 54 of ACU 16B. To provide a reference for checking the first signal, the modulating frequency is to be extracted from the second signal 220, using the O/E converter 46 and the tunable electrical filter 48. Further, for the case of FM modulation, two filtered signals are detected by two respective detectors of the modulation frequency: FM detector 50 and FM detector 52. Outputs of the detectors 50 and 52 are compared by a comparator (such as a correlator) 53, and the result of comparison is fed to one of inputs of a control-processing block CP which is marked 54 in this figure. Other inputs of the CP 54 serve for: receiving instructions from NMS or other managing entity (preferably), receiving ID data from a client supposed to obtain the dropped channel (optionally), and may also serve for receiving additional information (optionally), for example concerning other parameters checked in the channel to be dropped (say, its wavelength, as proposed in FIG. 2).

It should be noted that an additional code may be transmitted over the predetermined modulation tone, for further detecting and identifying at the OADM. The additional code can be applied using modulation techniques other than that of the modulating tone, for example using PSK, etc.

Figure 4A:
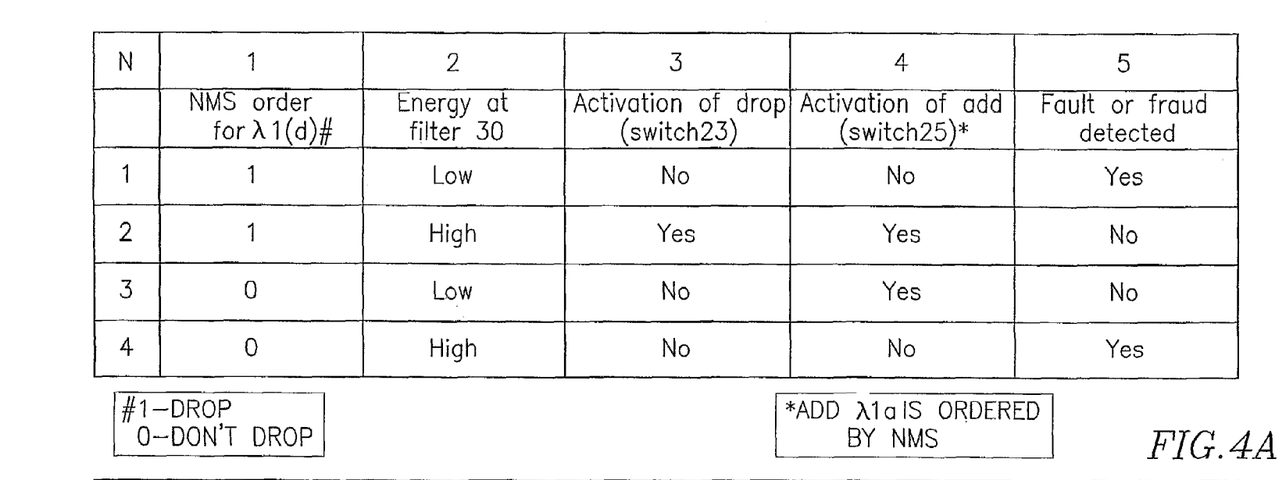
FIGS. 4*a* and 4*b*—illustrate exemplary tables presenting the proposed add/drop control mechanism of the self-checking OADM, taking into account instructions obtained at the OADM from a Network Management System (NMS).
Figure 4B:
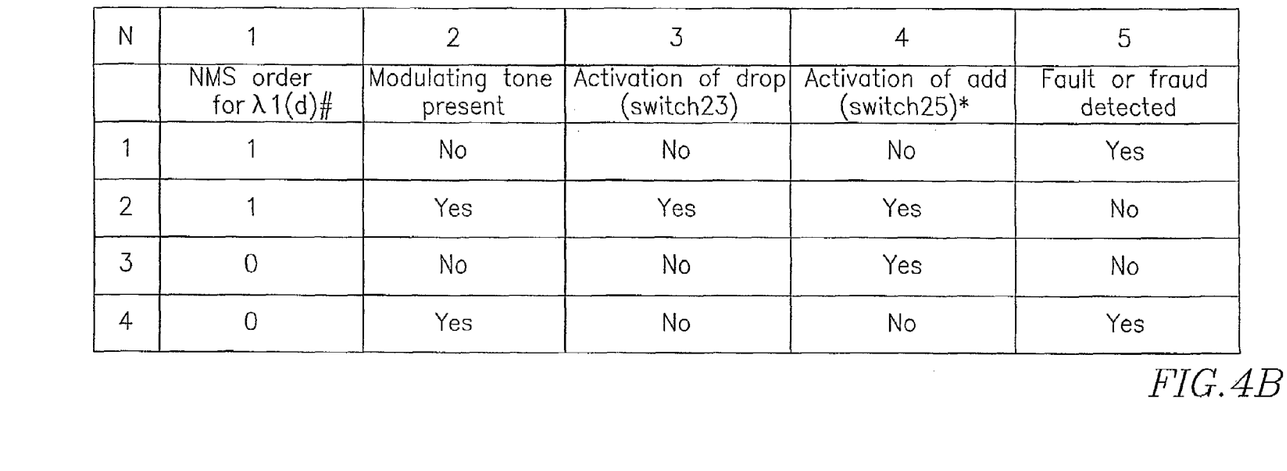

FIGS. 4a and 4b—illustrate an example of add/drop mechanism (in the table form) for the proposed self-checking OADM; the mechanism is based on monitoring the presence of the optical channel to be dropped and on the result of authentication of that channel and other conditions (though they are not all reflected in the tables, for example confirming the client's ID). The mechanism is implemented by a Control and Processing unit. One important assumption of the algorithm is that the Network Management System (NMS) is updated about the present status of channels which should exist in the network. Another important assumption is that NMS never requests adding a specific channel to the network link if that channel is considered by the NMS to be already present in that link. In the tables 4a and 4b, it is assumed that NMS has ordered adding the channel with the wavelength $\lambda 1a$ (either instead of the dropped one $\lambda 1d$, or to the suitable free channel in a WDM link).

FIG. 4a illustrates an example of the add/drop mechanism in the self-checking OADM assembly 10, where the ACU is based on comparing the carrier wavelengths of a channel to be dropped and of a corresponding channel to be added. One may notice that in cases where the status of the dropped channel according to NMS contradicts to the internally checked presence of a signal in the expected channel (see lines 1, 4 of the table 4a), the ACU of the OADM states the situation of fault/fraud and does not allow the drop and add operations.

FIG. 4b illustrates a similar table, which can be built when another criterion is checked for authentication of an optical channel to be dropped via the OADM 10. In this table, the criterion is the presence or absence of a pre-determined modulating tone in the signal of a channel to be dropped, equal to that which is inserted in the signal of the corresponding channel to be added at the OADM. One may note that the table 4b is just the table 4a where the second column is replaced with analogous information related to the modulating tones (please refer to FIG. 3). However, if the client's ID/password/key were required to be presented to the ACU (CP) of the OADM for check and then occurred to be incorrect, the dropping operation can never be allowed.

One should appreciate that other embodiments of the Authentication and Control unit (ACU) of an OADM assembly could be presented and considered part of the invention, the ACU should be capable of comparing a signal created at the add unit of the OADM for a particular optical channel with a signal dropped by the drop unit of the OADM in the same optical channel, and capable of deciding whether to allow dropping of that channel to the client, and/or adding thereof to the network.

The invention claimed is:

1. A method for performing add/drop operations in an optical add-drop multiplexer (OADM) assembly serving an optical network and comprising an add unit and a drop unit having a number of ports, the method comprising performing the following steps within the OADM assembly:
   detecting a first signal dropped from the network at the drop unit at a port assigned to an optical channel having an optical carrier wavelength $\lambda$,
   providing a second signal having the carrier wavelength $\lambda$ of said optical channel, said second signal being suitable for adding to the network via the add unit,
   performing authentication of said optical channel by comparing one or more components of said first signal with one or more components of said second signal serving as a reference, and
   allowing or blocking the drop operation of said optical channel to a client and/or the add operation of said optical channel to the network, based on a result of said authentication.

2. The method according to claim 1, wherein the authentication step of said optical channel comprises at least one of the following checks:
   comparison of a real carrier wavelength $\lambda d$ of the first signal dropped at the drop unit with the carrier wavelength $\lambda$ of the second signal,
   considering the optical channel to be authenticated when said $\lambda d$ is essentially equal to said $\lambda$, and
   checking a fact of presence of a predetermined modulating tone in the first signal, wherein said predetermined modulating tone being preliminarily inserted in the second signal.

3. The method according to claim 1, wherein the step of allowing or blocking the operation of adding and dropping comprises taking into account information about expected channels to be dropped/added at specific ports the OADM.

4. The method according to claim 3, further comprising checking a password submitted to the OADM assembly by a client supposed to receive the first signal from the drop unit, and allowing the dropping operation to said client when the password is approved by the OADM assembly.

5. An optical add-drop multiplexer (OADM) assembly comprising a drop unit and an add unit for serving an optical network,
said OADM assembly, with respect to at least one optical channel assigned to an optical wavelength λ, being capable of:
dropping said channel from the network via the drop unit as a first signal, and
adding said channel to the network via the add unit as a second signal,
the OADM assembly additionally comprising an authentication and control unit (ACU) for authenticating said at least one optical channel and controlling said OADM assembly,
said ACU being operative to authenticate said at least one optical channel by comparing one or more components of said first signal with one or more components of said second signal serving as a reference, and
the ACU being also operative to make decisions whether to allow or block the dropping of said optical channel to a client and/or the adding of said optical channel to the network, based on a result of said authentication.

6. The OADM assembly according to claim 5, wherein the ACU is operative to make decisions by taking into account at least one of the following factors:
whether said optical channel is expected to be dropped and/or added,
whether a password submitted by client matches to a predetermined password stored in the ACU,
whether a real optical carrier wavelength λd of a first optical signal dropped at a drop port assigned to an optical channel having an expected carrier wavelength λ, matches to said expected carrier wavelength λ of the second signal, and
whether a predetermined modulating tone, applied at said ACU to said second signal, is present in said first signal.

7. The OADM assembly according to claim 5, wherein the ACU is capable of performing:
a) monitoring a port of the drop unit, assigned to an optical channel having a carrier wavelength λ which is expected to be dropped according to information from a network management system (NMS), for detecting presence of any dropped channel;
b) authentication of the optical channel whenever detected; and
c) based on results of the steps a) and b), deciding whether to allow the adding of said optical channel via the add unit to the network and/or the dropping of the optical channel via the drop unit to the client.

8. The OADM assembly according to claim 5, wherein ACU comprises a control and processing unit CP for processing at least the authentication result, and for making said decisions.

9. The OADM assembly according to claim 5, being a Reconfigurable OADM (ROADM).

10. The OADM assembly according to claim 5, wherein the add unit comprises at least one tunable laser TL for adding said at least one optical channel to the optical network, the ACU of the OADM is capable of comparing respective carrier frequencies $\omega_{\lambda d}$ and $\omega_\lambda$ of the respective wavelengths λd and λ by selectively altering the carrier frequency ωλ at the wavelength λ, to obtain a control signal with altered frequency $\omega_\lambda + \omega_{\lambda if}$ where λif is an intermediate wavelength and $\omega_{\lambda if}$ is a corresponding intermediate frequency;
the ACU further comprising a mixing block for mixing said control signal with said first signal having the carrier frequency $\omega_{\lambda d}$, thereby obtaining a mixed signal;
the ACU further comprising an optical filter capable of detecting energy of the mixed signal at the intermediate frequency $\omega_{\lambda if}$; and
the ACU also comprising a comparator block capable of comparing the energy detected by said optical filter with a predetermined energy threshold.

* * * * *